United States Patent [19]

Eggert et al.

[11] Patent Number: 4,733,582
[45] Date of Patent: Mar. 29, 1988

[54] CONTROL VALVE SYSTEM FOR A CONTINUOUSLY VARIABLE BELT DRIVEN TRANSMISSION FOR MOTOR VEHICLES

[75] Inventors: Ulrich Eggert, Cologne; Hermann Staffel, Bergisch-Gladbach, both of Fed. Rep. of Germany

[73] Assignee: Ford Motor Company, Dearborn, Mich.

[21] Appl. No.: 887,852

[22] Filed: Jul. 21, 1986

[30] Foreign Application Priority Data

Jan. 24, 1986 [DE] Fed. Rep. of Germany ....... 3602137

[51] Int. Cl.⁴ ..................... B60K 41/12; B60K 41/16; B60K 41/18
[52] U.S. Cl. ........................................ 74/867; 74/866; 474/28
[58] Field of Search .................. 74/866, 867, 868, 869; 474/12, 28

[56] References Cited

U.S. PATENT DOCUMENTS

| | | | |
|---|---|---|---|
| 2,903,910 | 9/1959 | Carnegie | 74/868 X |
| 3,646,836 | 3/1972 | Kubo et al. | 74/868 X |
| 4,536,171 | 8/1985 | Tanaka et al. | 74/866 X |
| 4,545,265 | 10/1985 | Abo et al. | 74/867 X |
| 4,559,850 | 12/1985 | Sakakibara | 474/12 X |
| 4,610,183 | 9/1986 | Nobumoto et al. | 74/867 X |
| 4,631,043 | 12/1986 | Tokoro et al. | 474/28 X |
| 4,638,689 | 1/1987 | Sakai | 74/867 X |

FOREIGN PATENT DOCUMENTS

| | | | |
|---|---|---|---|
| 3107998 | 10/1982 | Fed. Rep. of Germany | 74/867 |
| 3310786 | 9/1984 | Fed. Rep. of Germany | . |
| 0029570 | 3/1977 | Japan | 74/869 |
| 0024958 | 3/1978 | Japan | 74/867 |
| 0076351 | 3/1982 | Japan | 74/867 |
| 0017054 | 1/1984 | Japan | 474/28 |
| 0785074 | 12/1980 | U.S.S.R. | 74/867 |

Primary Examiner—Dirk Wright
Attorney, Agent, or Firm—Frank G. McKenzie; Donald J. Harrington

[57] ABSTRACT

A control valve system for controlling the operation of a continuously variable belt-driven motor vehicle transmission includes a first hydraulic pump that supplies fluid to the displacement cylinders of the transmission through a main pressure regulating valve and a transmission ratio control valve as a function of the setting of the manual selector valve and as a function of the torque requirement and speed of the vehicle. The torque converter is supplied with hydraulic fluid by way of a relief valve which comes into operating in the event of failure of an electronic control unit and a decrease in the vehicle speed. A first emergency operation on/off valve transmits torque at converter discharge pressure, by way of a second emergency on/off valve, as emergency operation control pressure to a transmission ratio control valve.

5 Claims, 1 Drawing Figure

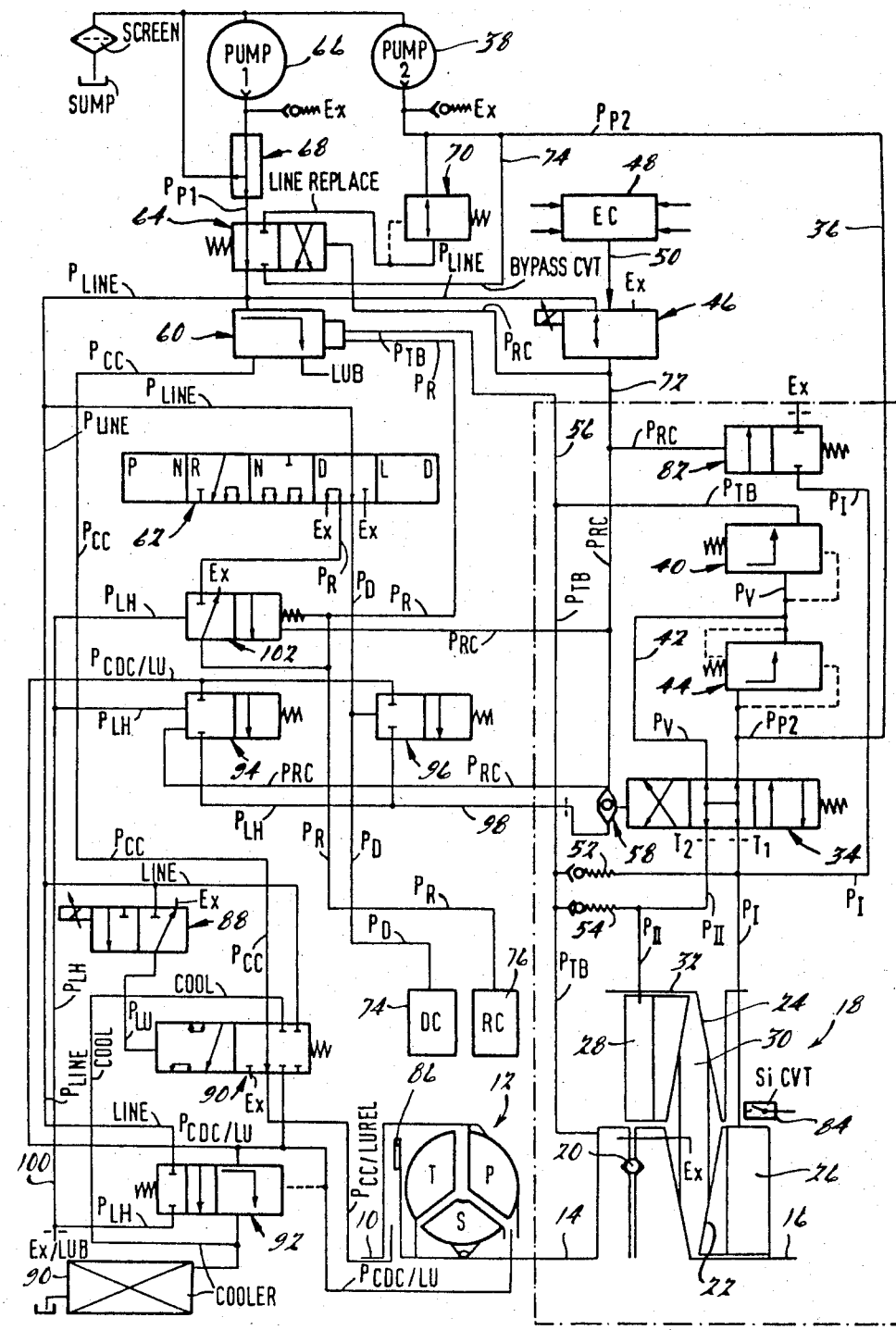

CONTROL VALVE SYSTEM FOR A CONTINUOUSLY VARIABLE BELT DRIVEN TRANSMISSION FOR MOTOR VEHICLES

BACKGROUND OF THE INVENTION

1. Field of the Invention

This invention relates to a control system for a continuously variable transmission of the type having two conical variable diameter pulleys driveably connected by a belt for producing variable speed ratios as the relative diameters of the pulleys change. In particular, this invention relates to such a transmission control system that includes an electronic control unit, and more particularly pertains to such transmission control systems that include hydraulic control valves for actuating the various components of the transmission that establish the operating speed ratio of the transmission.

2. Description of the Prior Art

A control valve system for a continuously variable transmission of this type is described in German Offenlegungsschrift No. 3310786. In that system, the primary shaft is driven directly by an internal combustion engine through a torque sensor. The transmission includes variable displacement cylinders associated with each of two pairs of cone pulleys, which are alternately pressurized and vented through the operation of control valves supplied with pressurized hydraulic fluid from the hydraulic pump. Control signals, determined by a torque requirement and by the road speed of the vehicle, are generated in electronic form by an electronic control unit whose output determines the magnitude of the electrical voltage or current supplied to the windings of a solenoid-operated main control valve.

This system has no provision that would permit any emergency operation in the event of failure of the electronic control unit.

SUMMARY OF THE INVENTION

It is an object of this invention to provide a control valve system for a continuously variable automotive transmission operating in combination with a hydrokinetic torque converter to permit limited emergency operation of the motor vehicle if an electronic control unit should fail.

In the system according to this invention, an internal combustion engine drives the primary shaft of a transmission through a hydrokinetic torque converter supplied with fluid from a hydraulic pump. The pump is connected by way of a limiting valve and a bypass valve to the main pressure regulating valve, which supplies the torque converter by way of a torque converter relief valve. The transmission ratio control valve is controlled by a transmission ratio control-pressure solenoid valve that produces several magnitudes of control pressure in accordance with the signal produced by the electronic control unit. The control pressure alternately produces continuous changes in the drive ratios during normal operation or a rapid change to the lower drive ratio range to accelerate the vehicle from a standing start.

The discharge of a second hydraulic pump is combined with the output of the first pump to assure an adequate supply of fluid to the displacement cylinders of the transmission, which are pressurized and vented alternately to produce the range of drive ratios.

If the electronic control unit becomes inoperative and the engine speed is below 1200 rpm a relief valve directs torque converter discharge fluid to the ratio control valve as a substitute for the absent ratio control pressure.

A reverse non-return valve supplied with the torque converter discharge pressure prevents engagement of reverse drive at vehicle speeds above 15 km/h. When a manual selector valve is located in positions P, R and N, a transmission ratio locking valve allows the torque converter discharge pressure to act on the transmission ratio control valve, and as a result the ratio control pressure is overridden by the ratio control pressure solenoid valve to keep the transmission in the lower ratio range.

BRIEF DESCRIPTION OF THE DRAWING

The FIGURE is a diagrammatic illustration of the control valve system according to this invention and the components required to control the continuously variable speed ratio transmission.

DESCRIPTION OF THE PREFERRED EMBODIMENT

Located at the bottom center of the FIGURE is a hydrokinetic torque converter 12, whose impeller P is driveably connected to an input shaft 10 driven by an internal combustion engine. The torque converter includes a stator S and a turbine T in addition to the impeller. The turbine shaft 14 drives the primary or input shaft 16 of a cone pulley belt-driven transmission shown generally at 18. A torque sensor 20 is located within the drive path between turbine shaft 14 and primary shaft 16. The belt drive transmission includes first and second conical pulleys 22, 24, a primary displacement hydraulic cylinder 26, a secondary displacement hydraulic cylinder 28, an endless traction belt 30, and a secondary or output shaft 32. The belt rotates on the conical pulleys and maintains contact on the pulleys in accordance with the pressurized or vented state of the cylinders 26, 28. For example, when cylinder 26 is pressurized, the belt moves radially inward on pulley 22 and radially outward on pulley 24 and the transmission produces higher speed ratios. Conversely, when cylinder 28 is pressurized, the belt moves radially inward on pulley 24 and radially outward on pulley 22 and lower speed ratios result.

Transmission ratio control valve 34 directs pressurized hydraulic fluid alternately to displacement cylinders 26, 28. Valve 34 is connected by line 36 to the output of hydraulic pump 38. Line pressure valve 40 directs fluid at line pressure through hydraulic line 42 to valve 34. Differential pressure valve 44 monitors the difference in hydraulic pressure between the pressure produced at the outlet of pump 38 and line pressure PV at the output of valve 40.

Transmission ratio control pressure solenoid valve 46 directs fluid at transmission ratio control pressure PRC to valve 34, valve 46 being controlled by an electronic control unit 48, which processes data related to the operation of the internal combustion engine and the motor vehicle. For example, the electronic control is adapted to receive data related to the torque demanded of the engine and the speed of the vehicle. It produces as output after processing this information, electrical control signals carried on line 50 to selectively energize and de-energize the coil of the solenoid of valve 46.

Control valve 34 both pressurizes and vents cylinders 26, 28. The hydraulic fluid in the cylinders is vented in accordance with the effect of throttle valves 52 and 54 located in the hydraulic lines that vent the cylinders.

Hydraulic line 56 carries fluid at torque control pressure PTB from torque sensor 20 to line pressure valve 40 and the main pressure regulation valve 60.

A second hydraulic pump 66 driven by the engine, supplies bypass valve 64 by way of flow limiting valve 68. The output of pump 38 is connected through pressure reduction valve 70 to a port of bypass valve 64. Hydraulic fluid at transmission ratio control pressure PRC is supplied through hydraulic line 72 to one end of the bypass valve to produce a force in opposition to the force of a spring located at the other end of the bypass valve. When PRC goes high in response to the control of unit 48, an increased hydraulic pressure or flow rate is required, and bypass valve 64 supplies an increased quantity of hydraulic fluid through bypass CVT line 74 and ratio control valve 34 to the displacement cylinders of the belt drive transmission 18.

Pump 66 supplies main pressure regulating valve 60, which produces line pressure, PLINE, and torque converter supply pressure, PCC, as a function of the torque control pressure PTB carried to valve 60 in line 56.

The manual selector valve 62, which can be moved by the vehicle operator among the conventional positions P, R, N, D and L, is supplied with line pressure. In accordance with the operating position of the manual selector valve, line pressure is supplied to the forward clutch 74 and reverse clutch 76, which are alternately pressurized to produce forward drive ratios and rear drive ratios, respectively.

The torque convertor supply pressure PCC is supplied to the torque converter 12 by way of a control valve arrangement that includes bridging solenoid valve 88 and bridging on-off valve 90. The solenoid of valve 88 is connected to an output port of electronic control unit 48 to control the pressure produced by valve 88. The output signal from the electronic control unit 48 controls the magnitude of the transmission ratio control pressure PRC produced at the output of solenoid-operated valve 46. This output pressure is used to control the rapid shift-down valve 82 and other valves of the hydraulic control network. Valve 46 produces pressure whose magnitude is in the range 2–4 bar (29–58 psi) during normal operation. When the control pressure is 2 bar, the transmission ratio is rapidly changed to a higher speed ratio; when the control pressure is 4 bar, the transmission ratio is changed rapidly to a lower speed ratio. No change in the transmission ratio takes place at a control pressure of approximately 3 bar.

The electronic control unit has the capacity to identify the occurrence of an abrupt, emergency braking of the motor vehicle that requires a stoppage displacement of the continuously variable transmission, i.e., a transmission ratio change from a high ratio to a lower ratio, so that the vehicle can be accelerated from a relatively low speed. The electronic control unit identifies this condition from information supplied as input that includes a throttle angle equal to zero, vehicle speed of approximately zero, an engine speed of less than 1,000 rpm and a transmission ratio $i_{CVT}$ that is not equal to the lowest transmission ratio. When these conditions are present at the input of the electronic control unit, the output signal 50 causes the solenoid operated control pressure valve 46 to increase the ratio control to 6 bar, and a rapid displacement to the lower transmission ratio range results. Hydraulic pressure at this magnitude is supplied to the ratio control valve 34, rapid shift-down valve 82 and bypass valve 64. Then cylinder 26 is filled rapidly with hydraulic fluid and pressurized, thereby causing a transmission ratio change to the lower speed ratio range. Valve 82 vents cylinder 26 by opening that cylinder to its exhaust port, Ex. Valve 64 connects the output of pump 66 to line 36 so that both pumps supply fluid through line 36 to an inlet port of 34. The high level of ratio control pressure causes valve 34 to connect line 36 to cylinder 28 so that it is filled and pressurized rapidly to complete the shift to the low speed ratio.

When the transmission is moved to the lowest possible speed ratio, switch 84 changes state and that information is transmitted to the electronic control unit. Alternatively, a change in the position of the engine throttle valve or a change in the speed of the vehicle can be used to signal that the stoppage displacement of the transmission to the lower transmission ratio range can be discontinued.

During starting conditions, the torque converter 12 is supplied from pressure regulation valve 60 through valve 90 with converter supply pressure PCC, which flows through the torque converter in one direction and causes bridging clutch or lockup clutch 86 to disengage. Hydraulic fluid flowing from the converter is directed to cooler 91 by torque converter relief valve 92. If lockup clutch 86 is to be engaged, converter lockup pressure PLU is directed by way of lockup solenoid valve 88 and lockup on/off valve 90 to the intake side of the converter. When this occurs, lockup clutch 86 is engaged because of the reverse fluid flow direction.

Torque converter relief valve 92, located on the discharge side of the torque converter, operates to assure that the torque converter is initially completely filled and that hydraulic fluid flows through the converter without exceeding the operating pressure of the torque converter.

The valve 92 is a flow quantity valve, which changes state above a predetermined flow rate, for example, the flow rate associated with the speed of the engine over 1200 rpm. Relief valve 92 also acts as a first emergency operation on/off valve to connect the line pressure PLINE as an emergency operation control pressure PLH, supplied to an emergency operation shift valve 94. The torque converter discharge pressure PCDC and the transmission ratio control pressure PRC also act on the shift valve 94.

The converter discharge pressure also acts on transmission ratio non-return valve 96, on which the control pressure PD for the forward drive clutch 74 also acts. Therefore when manual selector valve 62 is located in positions D and L, valve 96 closes communication between the converter discharge pressure and ratio control valve 34. However, when manual valve 62 is in position P, R or N, the converter discharge pressure is connected through valve 96 and hydraulic line 98 to control the position of ratio control valve 34. When this occurs, valve 34 controls the supply of hydraulic fluid to the transmission and produces transmission operation in a low ratio range.

When the engine speed exceeds 1200 rpm, emergency operation control pressure PLH, present at the output of valve 92, is carried in hydraulic line 100 to reverse gear non-return valve 102, which is acted upon also by the control pressure for the reverse gear, PR, and by the transmission ratio control pressure PRC. Due to the control pressure applied to valve 102, i.e., when the emergency operation control pressure, PLH, determines the state of valve 102, reverse gear clutch 76 is vented through valve 102, and reverse gear engagement is prevented when the vehicle speed is above 15 km/h.

A self-locking effect is produced when the reverse gear is already engaged by moving valve 62 to the R position. When reverse gear is selected manually, line pressure is supplied to reverse clutch 76 as pressure and line pressure also is applied as a control pressure on valve 102. Thereafter, if engine speed exceeds 1200 rpm or if vehicle speed exceeds 15 km/h, valve 92 directs line pressure as PLH to valve 102 in opposition to the effect of PR. In that case, valve 102 continues to direct line pressure to clutch 76.

The effect of transmission ratio control pressure on valve 102, assures that reverse gear can be engaged while the vehicle is standing and the engine is operating at a high speed, cold idle condition above 1200 rpm.

If the function of the electronic control unit is absent, transmission ratio control pressure would then be unavailable to control the state of valve 34, which otherwise would determine the drive ratio produced by the transmission. If the electronic control unit should fail due to a loss of electrical power or for any other reason, the continuously variable transmission 18 is shifted to the lower transmission ratio as a result of valve 94 producing as output the emergency output control pressure PLH, which is the converter discharge pressure PCDC carried in hydraulic line 98 to control the state of valve 34. With control unit 48 inoperative and with engine speed below 1200 rpm, to accelerate the vehicle from rest the transmission is shifted to the lower ratio range because PLH moves valve 34 to the state represented at the right-hand side of its schematic representation. In that state, valve 34 connects lines 36 and 42 to cylinders 28 and 28, respectively. This action pressurizes cylinder 26 and produces low ratio operation.

If the speed of the engine rises again to over 1200 rpm when the motor vehicle is started after a failure of the electronic control unit, the torque converter relief valve 92 connects line pressure to the emergency operation control pressure line 100, in which it is carried to control valves 94 and 102. This action causes PLH control pressure to open valve 94 and to vent reverse clutch 76 through valve 102. Converter discharge pressure at low pressure is disconnected by valve 96 from line 98 when manual valve is moved to the D or L positions. Control valve 34 connects line pressure to cylinder 26 and cylinder 28 discharges through check valve 54 to shift the transmission to the high ratio range.

Having described the preferred embodiment of my invention, what I claim and desire to secure by U.S. Letters Patent is:

1. A hydraulic valve system for controlling a continuously variable drive ratio automotive vehicle transmission adapted to shift continuously between different drive ratios and having first and second control pulleys driveably connected by an endless traction belt, a displacement cylinder associated with each pulley, the location of the belt on each pulley being radially variable in response to hydraulic fluid pressure in the associated cylinder to shift between the drive ratios, comprising:
   first and second hydraulic fluid pumps;
   electronic control means for producing an electrical control signal
   a ratio pressure control valve coupled to the electronic control means for producing ratio control pressure whose magnitude varies in accordance with the control of the electronic control means;
   a bypass valve means subject to the control of the ratio control pressure for opening and closing communication between the discharge of the first and second pumps when a drive ratio change is required;
   ratio control valve means subject to the control of the ratio control pressure and hydraulically connected to the discharge of the first pump for selectively opening hydraulic communication between the discharge of the first pump and the first and second displacement cylinders in accordance with the required drive ratio.

2. The system of claim 1 further comprising:
   a torque converter for producing a hydrodynamic driving connection between the engine and the first pulley of the transmission;
   a torque sensor means located between the output shaft of the torque converter and the first pulley of the transmission for producing torque control pressure in accordance with the torque transmitted between the torque converter and the transmission; and
   a main pressure regulating valve means connected to the discharge of the second pump for producing line pressure and torque converter supply pressure as a function of torque control pressure.

3. The system of claim 1 further comprising:
   a manual selector valve means moveable between forward and reverse drive positions and supplied with line pressure for selectively connecting line pressure to the forward drive and reverse drive outlets of the manual valve means in accordance with the selected valve position;
   a forward clutch and a reverse clutch for producing forward and reverse drive, respectively, when pressurized, the forward clutch communicating hydraulically with the forward drive outlet;
   reverse drive non-return valve means communicating hydraulically with the reverse drive outlet for hydraulically connecting the reverse clutch and the reverse drive outlet and for hydraulically venting the reverse clutch.

4. The system of claim 1 further including:
   a rapid shift-down valve means subject to the control of the ratio control pressure for venting a displacement cylinder; and
   wherein the ratio control pressure valve produces first and second magnitudes of ratio control pressure that controls the operation of the ratio control valve to produce, respectively, the high and low drive ratios and a third magnitude of ratio control pressure to control the operation of the bypass valve means and the rapid shift-down valve means to produce a rapid shift from the high drive ratio range to the low drive ratio range.

5. The system of claim 4 wherein the ratio control pressure valve produces the third magnitude of ratio control pressure in response to the signal produced by the electronic control unit as a function of vehicle speed below a predetermined speed, or engine speed below a predetermined engine speed, or throttle angle below a predetermined angle or drive ratio above a predetermined ratio.

* * * * *